F. E. HERDMAN.
ELEVATOR.
No. 11,327. Reissued Apr. 25, 1893.
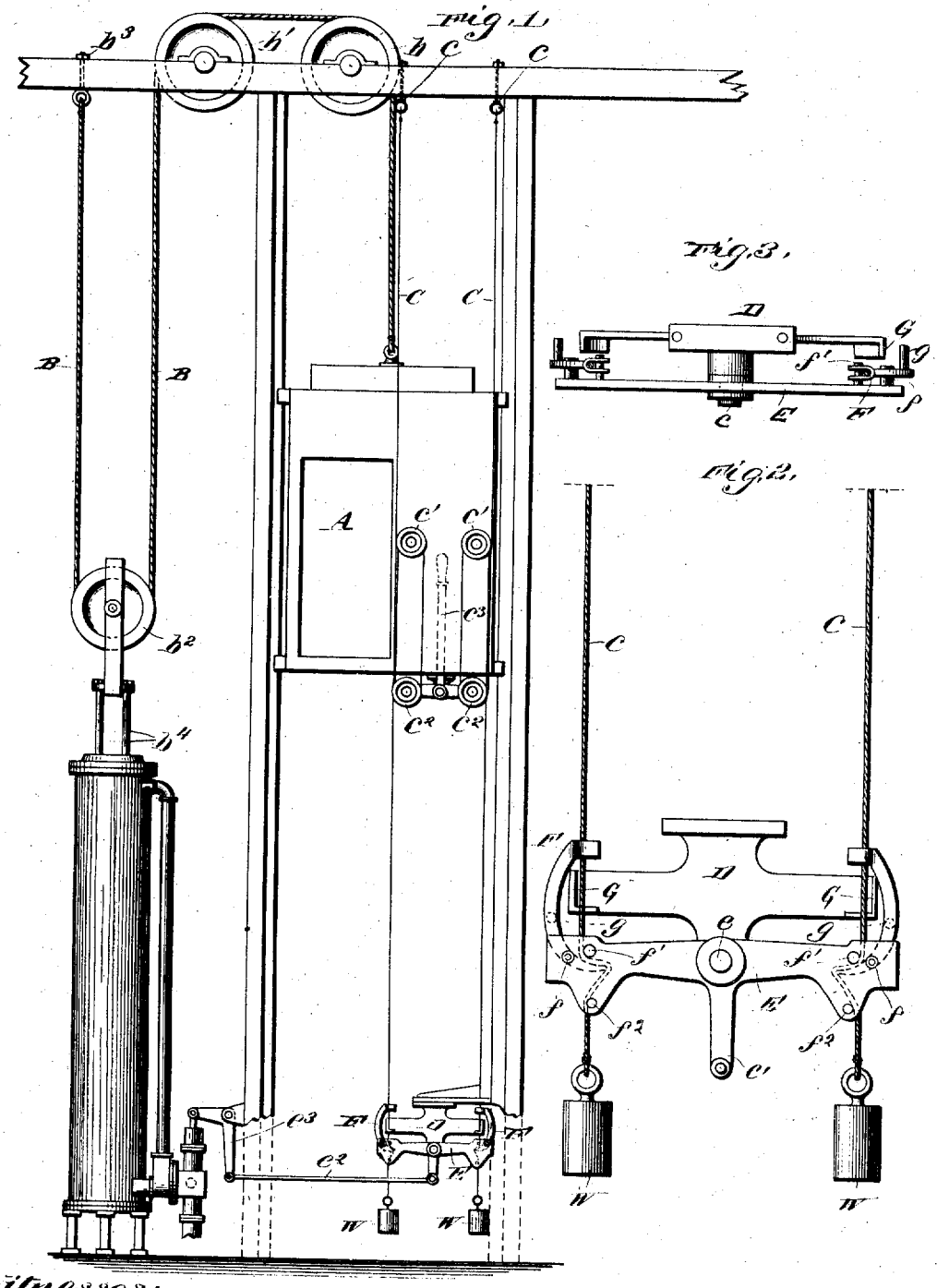
Witnesses:
Frank S. Busser
M. F. Ellis.
Inventor:
Frank E. Herdman
by his atty
G. H. Harding

UNITED STATES PATENT OFFICE.

FRANK E. HERDMAN, OF INDIANAPOLIS, INDIANA.

ELEVATOR.

SPECIFICATION forming part of Reissued Letters Patent No. 11,327, dated April 25, 1893.

Original No. 487,268, dated December 6, 1892. Application for reissue filed March 18, 1893. Serial No. 466,563.

*To all whom it may concern:*

Be it known that I, FRANK E. HERDMAN, a citizen of the United States, residing at Indianapolis, county of Marion, and State of Indiana, have invented a new and useful Improvement in Elevators, of which the following is a full, clear, and exact description, reference being had to the accompanying drawings, which form a part of this specification.

My invention has for its object an arrangement, whereby if one of the operating cables should break the car can still be operated by the other cable and brought to any point in its travel desired by the operator; and it consists in certain construction of mechanism whereby this result is obtained.

In the drawings, Figure 1 is a side elevation. Fig. 2 is a detached side elevation of parts of mechanism. Fig. 3 is a detached plan view of the same.

A is the elevator-car; B, the lifting cable, which is connected to the car and passes over the pulleys $b$ $b'$ and around the traveling sheave $b^2$ and is connected to a fixed support at $b^3$. The sheave $b^2$ is connected to the piston $b^4$, which operates by hydraulic power in the ordinary manner.

C are the operating-cables, which are connected at the top to the beam at $c$ $c$ and pass through the car, passing around the pulleys $c'$ $c'$ $c^2$ $c^2$, which are operated by the lever $c^3$. To the end of each cable is attached a weight W.

D is a bracket to which is attached the lever E, pivoted to said bracket at $e$ and having the dependent portion $e'$, to which is connected the rod $e^2$, connected to the bell-crank $e^3$, which in turn is connected to the operating-valve. To each end of the lever E is attached a bent lever F, pivoted to said lever at $f$. At each end of the lever E are also the pins $f'$ $f^2$. One end of each of the levers F is grooved and the cables C C pass through said grooves and around the pins $f'$ $f^2$ and around the end of levers F (see Fig. 2) when the cable is taut, as in normal operation of elevation, and the operating lever $c^3$ in position shown in Fig. 1. The lower ends of levers F are in such position as to bend the cables around the pins $f'$ $f^2$, and in consequence a movement of lever $c^3$ will tip lever E the same as if it were fixedly fastened on the end of lever E, and the weights $w$ $w$ balance each other. If either cable C should break, the rope on that side becomes slack and the lever F on that side drops inwardly, which loosens the cable around the pins $f'$ $f^2$, thereby relieving the weight W on that side, and it falls. The weight on the unbroken cable is now able to draw that end of the lever down and the operator can operate the unbroken cable upward, thereby allowing the car to be operated, although one cable be broken. As the weight of the unbroken cable tends to draw that end of the lever down, and in consequence if the lever is thrown in position on the car to be at rest, this weight would tend to operate the car in the other direction. To prevent this, the bracket D, to which the lever E is attached, can have a projection G at each end and the levers F a pin $g$. Now in case the cable at the left side should break when the lever E is above the center the pin $g$ would rest against the projection G and prevent the lever F from dropping inward until the lever E has been brought to the center by the starting of the cable attached to the right hand of lever E. As soon as the lever E has been brought to the center then the pin $g$ will be below the projection G, and in consequence the lever F would drop inward, loosening the cable and allowing the weight W to drop. By this arrangement the weight W on the right-hand lever F could not tip lever E from the central position, and in consequence there would be no danger of the weight reversing, as it could only bring it to a central position.

Having now fully described my invention, what I claim, and desire to protect by Letters Patent, is—

1. In an elevating apparatus, the combination of the operating-cables, means for exerting a downward strain upon each of said cables, a pivoted lever E, pins upon said lever, around which said cables pass, levers F at each end of said lever E, around the ends of which levers F the cables pass, and intermedial mechanism between the operating-cables and the operating mechanism.

2. In an elevating apparatus, the combination of the operating-cables, means for exerting a downward strain upon each of said cables, a lever, as E, a bracket, as D, to which said lever is pivoted, projections upon said bracket, pins upon said lever, around which said cables pass, levers F at each end of said lever E, around the ends of which levers F said cables pass, and pins upon said levers in line with the projections upon the bracket.

3. In an elevating apparatus, in combination, the operating-cables, valve-operating lever, means for exerting downward and normally-counterbalancing strains upon said cables and lever and means, substantially, as described, when the cable in action breaks to retain the counterbalancing strain upon the corresponding side of said lever until said lever is brought to the center and to relieve the said strain upon the lever when the lever attains its central position.

4. In an elevating apparatus, in combination, the operating-cables, valve-operating lever, means for exerting downward and normally-counterbalancing strains upon said cables and lever, and means, substantially, as described, when the cable in action breaks to retain the counterbalancing strain upon a portion of the broken cable and the corresponding side of said lever until the lever is brought to its central position and to relieve the said strain upon the portion of the broken cable and upon the lever when said central position is attained.

In testimony of which invention I have hereunto set my hand.

FRANK E. HERDMAN.

Witnesses:
B. O. BAILEY,
BEN P. GRAY.